W. V. TURNER.
FLUID PRESSURE BRAKE.
APPLICATION FILED JULY 20, 1906.

917,193.

Patented Apr. 6, 1909.
2 SHEETS—SHEET 1.

WITNESSES
J. S. Custer
B. MacDonald

INVENTOR
Walter V. Turner
by C. Wright
Att'y.

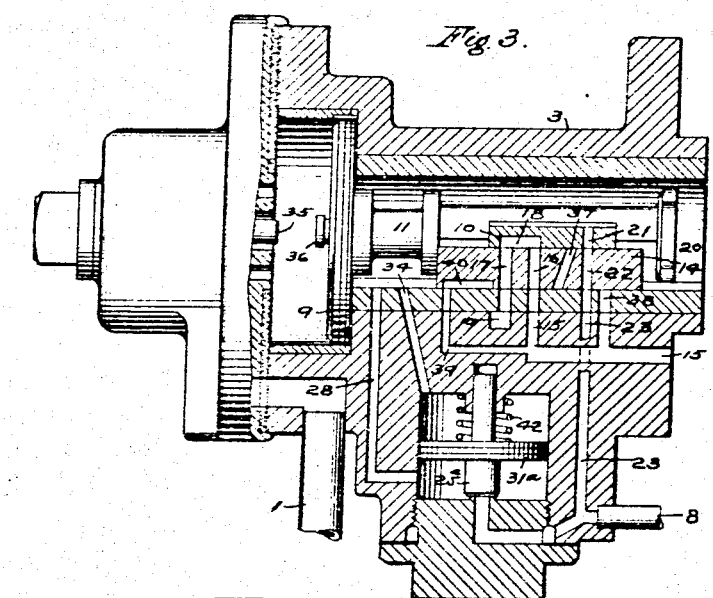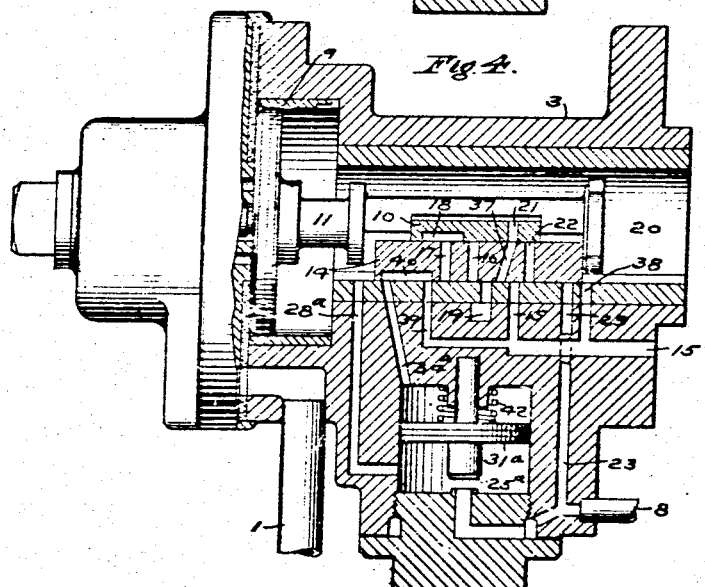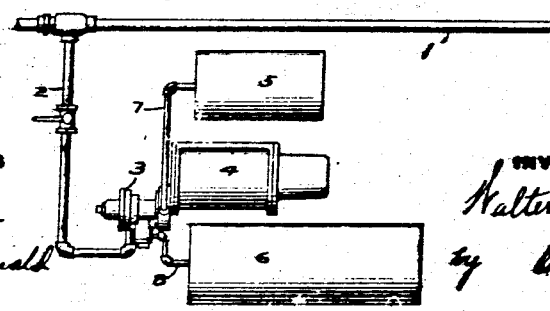

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 917,193.   Specification of Letters Patent.   Patented April 6, 1909.

Application filed July 20, 1906. Serial No. 327,053.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes for railway cars, and has for its principal object to provide improved mechanism for producing a very powerful application of the brakes in emergencies. This feature of the invention comprises, besides the usual equipment of train pipe, auxiliary reservoir, triple valve, and brake cylinder, an additional source of fluid under pressure, such as a supplemental reservoir, control pipe line, or other independent supply, and improved valve means, operated by fluid pressure, and controlled by the movement of the triple valve device, for supplying fluid under pressure for such additional source, to reinforce and augment the pressure admitted to the brake cylinder in emergency applications.

Another feature of the invention comprises improved means whereby the same additional source of fluid under pressure may be utilized, not only for reinforcing and augmenting the brake cylinder pressure in emergency applications, but may also be employed for effecting a graduated release of the brake and assist in recharging the auxiliary reservoir after a service application.

Figure 1:
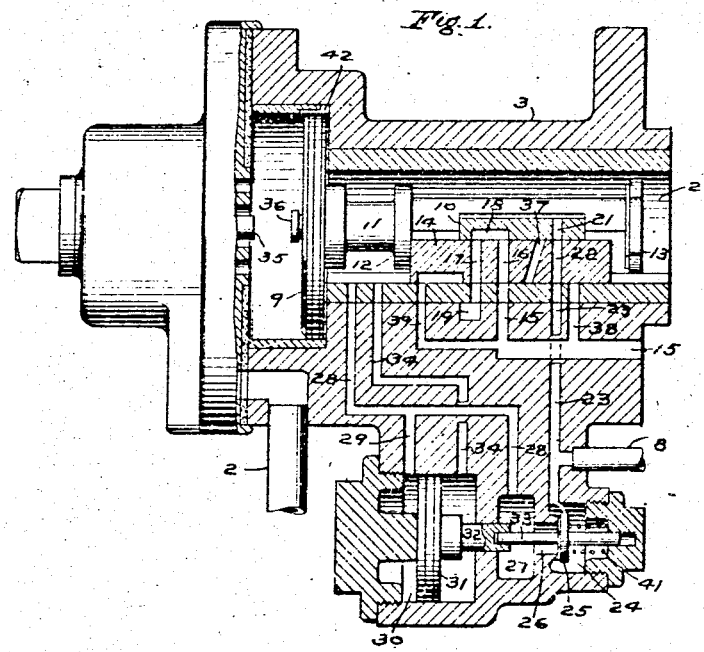
Figure 2:
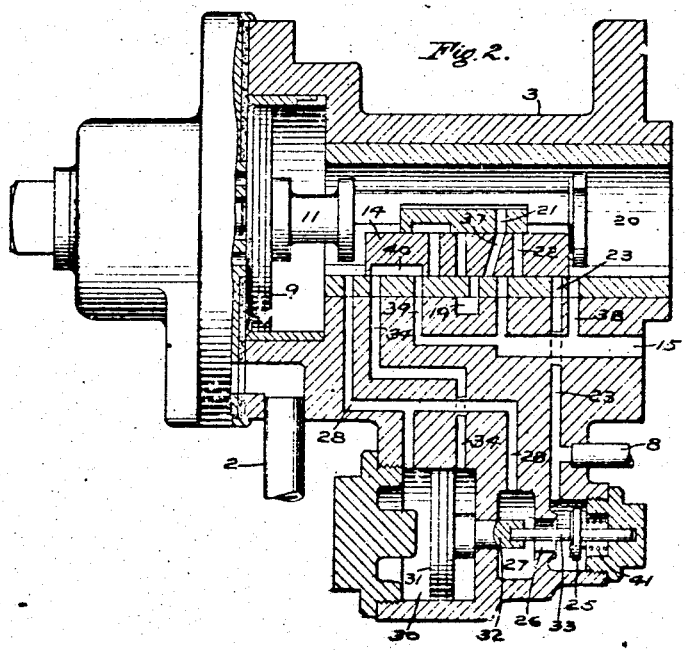

In the accompanying drawings, which illustrate my improvement; Figure 1 is a central section through a triple valve device with one form of my improvement applied thereto; Fig. 2 a similar section showing the valves and piston of the triple valve device and the valve and piston of the reinforcing valve device in the positions which they occupy when the brakes are being applied and the auxiliary reservoir pressure is being reinforced; Fig. 3 a central section showing a modification of my improvement, the parts being shown in release position; Fig. 4 a similar section showing the parts in position for applying the brakes and reinforcing the auxiliary reservoir; and Fig. 5 a view showing the train pipe, triple valve, brake cylinder, auxiliary reservoir, supplemental reservoir, and their connections.

In Fig. 5 of the drawings, the train pipe 1 is shown connected with the triple valve device, 3, as usual, by means of the branch pipe 2; the triple valve device being secured to the head of the brake cylinder, 4; and the auxiliary reservoir, 5, and supplementary reservoir, 6, being connected with the triple valve casing by the pipes 7 and 8, respectively.

In Fig. 1 the triple valve piston, 9, is connected with the graduating valve, 10, by means of the stem, 11, which is provided with the shoulders 12 and 13 for moving the main slide valve 14. In this figure the parts are shown in the positions they will occupy when the brakes are released. The brake cylinder passage, 15, is connected, through the passages 16 and 17 in the main valve and through the cavity 18 in the graduating valve, with the exhaust passage 19 leading to the atmosphere; and the supplemental reservoir is in communication with the chamber 20 and with the auxiliary reservoir through the passage 21 in the graduating valve, the passage 22 in the main valve, and the passage 23 in the valve casing. The passage 23 communicates with a chamber 24 in which is located a spring-pressed valve 25 which is normally seated and closes communication between the supplemental reservoir and the passage 28 through the passage 26 and chamber 27. The passage 28 opens at one end into the chamber 20, and is at all times in open communication with the chamber 20 and with the auxiliary reservoir. A branch 29 from the passage 28 opens into a chamber 30, in which is fitted a piston 31 provided with a stem 32 adapted to engage with the stem 33 of the valve 25, so that the movement of the piston 31 to the right will unseat the valve 25. The chamber 30 on the right of the piston 31 is connected with the chamber 20 by a passage 34, so that when the parts are in position to release the brakes, or to effect a graduated application of the brakes, the piston 31 is exposed on both sides to auxiliary reservoir pressure.

In making a graduated application of the brakes, the triple valve piston, 9, moves to the left until the short stem 36 makes contact with the spring stem 35. By the first part of this movement the graduating valve 10 is moved on the main slide valve so as to cut off communication between the passages, or ports, 16 and 17 in the main valve, and to close the port 22 in the main valve and connect the port 21 in the graduating valve with the port, or passage, 37, in the main valve. The further movement of the piston 9 and its stem 10 moves the main valve so as to connect the port 37 with the brake cylinder port 15, and fluid under pressure flows from the auxiliary reservoir through ports 21, 37, and passage 15 to the brake cylinder. When in this position the main slide valve covers the upper ends of the passages 23 and 38; communication between the auxiliary and supplemental reservoirs through the graduating valve and main slide valve is closed; and communication between the auxiliary reservoir and the supplemental reservoir through the passages 23, 26, chamber 27, and passage 29 is closed by the valve 25. In effecting such a graduated or ordinary service application of the brakes, the brake cylinder may be charged with the equalized auxiliary reservoir pressure or with any degree of pressure below that, and the release of the brakes may then be graduated by increasing the train pipe pressure to a degree slightly above that in the auxiliary reservoir and sufficient to return the piston 9 and the graduating and main valves to release position, shown in Fig. 1. Fluid will then be exhausted from the brake cylinder through port 19; and fluid from the supplemental reservoir will then flow through pipe 8, and passages 23, 22, and 21, into chamber 20, thereby increasing the auxiliary reservoir pressure; and, when the auxiliary reservoir pressure is thus increased to a degree slightly above the train pipe pressure, the piston 9 will be moved slightly to the left, and the graduating valve will cut off the exhaust from the brake cylinder and the flow from the supplemental reservoir to the auxiliary reservoir. This may be repeated as often as desired, or until the brakes are fully released. To effect a full and continuous release of the brakes the train pipe pressure must be increased sufficiently to hold the piston 9 in its position to the right.

When it is desired to effect a more forcible application of the brakes than can be obtained by supplying the brake cylinder with fluid from the auxiliary reservoir only, a sufficient reduction of train pipe pressure is made to permit the auxiliary reservoir pressure to move the piston 9 to the limit of its stroke to the left, as shown in Fig. 2. By this movement of the piston 9, the main side valve 14 is moved into position to close the exhaust passage 19 and the upper end of the passage 23, and to uncover the passage 38 so as to permit fluid from the auxiliary reservoir to flow through passage 15 to the brake cylinder. At the same time the cavity 40 in the main slide valve connects the passage 34 with the passage 39 and permits fluid to flow from the right side of the piston 31 to the brake cylinder. The auxiliary reservoir pressure on the left of piston 31 will then move that piston to the right so as to unseat the valve 25, and fluid under pressure will flow from the supplemental reservoir through pipe 8, passage 23, chamber 24, passage 26, chamber 27, and passage 28 to chamber 20 which is in open communication with the auxiliary reservoir; and the brakes will be applied with a force due to the higher equalized pressure in the brake cylinder, auxiliary reservoir, and supplemental reservoir. When the pressure in the brake cylinder has equalized with that in the reservoirs, the piston 31 will be balanced by the pressures on its opposite sides and the spring 41 will act to close the valve 25 and move piston 31 to the left.

The brakes are released by increasing the train pipe pressure sufficiently to move the piston 9 to the limit of its stroke to the right, when the main slide valve and the graduating valve will occupy the positions shown in Fig. 1. The auxiliary reservoir will then be charged through the feed groove 42, and the supplemental reservoir through the ports 21 and 22 in the graduating valve and main slide valve, and through the passage 23 and pipe 8.

The more forcible application of the brakes may be effected by movement of the piston 9 and main and graduating valves directly from the release position, or from the positions which these parts occupy in making a graduated or ordinary service application of the brakes; if the train pipe pressure be sufficiently reduced.

In the modifications shown in Figs. 3 and 4, the triple valve device is the same as that shown in Figs. 1 and 2; the piston 31ª, which operates the valve 25ª, to open communication between the supplemental reservoir and the auxiliary reservoir in high pressure applications of the brake, is normally exposed on its opposite sides to auxiliary reservoir pressure, and pressure is released from one side to the brake cylinder to effect opening movement of the valve, but the valve 25ª is formed on or rigidly connected with the piston, and is closed against the supplemental reservoir pressure by a spring 42.

It will be apparent that the reinforcing valve mechanism may open communication from the supplemental reservoir, or other additional source of pressure, to the brake cylinder, either direct or through the auxiliary reservoir, as shown, the latter being preferable, particularly where this improvement is used in connection with quick action triple valve devices of the standard type, in which the emergency valve operates to vent air from the train pipe to the brake cylinder in emergency applications. In that case, the flow of air from the supplemental reservoir, or additional source, to the auxiliary reservoir, will not interfere with the quick action of the emergency valves.

Having now described my invention, what I claim as new and desire to secure by Letters Patent, is:—

1. In an automatic fluid pressure brake, the combination, with a triple valve device, an auxiliary reservoir, and a brake cylinder, of an additional source of fluid under pressure having connections with the auxiliary reservoir; and a separate, or supplemental, valve device independently actuated by fluid pressure from the auxiliary reservoir, for controlling the flow of fluid from the additional source to the auxiliary reservoir, in applying the brakes.

2. In an automatic fluid pressure brake, the combination, with a triple valve device, an auxiliary reservoir, and a brake cylinder, of a supplemental reservoir, and a separate, or supplemental, valve device independently actuated by fluid pressure from the auxiliary reservoir and controlling the flow of fluid from the supplemental reservoir to the auxiliary reservoir in emergency applications of the brakes.

3. In an automatic fluid pressure brake apparatus, the combination, with an auxiliary reservoir, a brake cylinder, and a triple valve device, of a supplemental reservoir, a valve controlling communication between the supplemental reservoir and the auxiliary reservoir, and a separate piston operated by auxiliary reservoir pressure, the movement of which effects the opening movement of the valve for charging fluid under pressure into the auxiliary reservoir from the supplemental reservoir, for the purpose of obtaining a high pressure application of the brakes.

4. In an automatic fluid pressure brake, the combination, with a train pipe, auxiliary reservoir, triple valve device, and brake cylinder, of an additional source of fluid pressure, a reinforcing valve mechanism operated by auxiliary reservoir pressure for supplying fluid from said additional source to the auxiliary reservoir to augment the pressure admitted to the brake cylinder, and means governed by the movement of the triple valve for controlling the pressure on said reinforcing valve mechanism.

5. In an automatic fluid pressure brake, the combination, with a train pipe, auxiliary reservoir, brake cylinder, and a triple valve device having a piston and valve adapted to make a partial traverse under gradual reductions in train pipe pressure to supply fluid from the auxiliary reservoir to the brake cylinder, and to make a further or full traverse under a sudden reduction in train pipe pressure to effect a quick application of the brakes, of an additional source of fluid pressure, a separate valve for supplying fluid from said additional source to the auxiliary reservoir, a piston for actuating said separate valve, and means operating upon the further or full traverse of the triple valve piston for varying the pressure upon said separate piston and causing the opening of the separate valve.

6. In an automatic fluid pressure brake apparatus, the combination, with a train pipe, auxiliary reservoir, triple valve device, and brake cylinder, of an additional source of fluid pressure, a separate valve for supplying fluid from said additional source to reinforce and augment the pressure admitted to the brake cylinder, a piston normally exposed on its opposite sides to fluid under pressure, and means for releasing pressure from one side of the piston to effect the opening of the valve.

7. In an automatic fluid pressure brake apparatus, the combination, with a train pipe, auxiliary reservoir, triple valve device, and brake cylinder, of an additional source of fluid pressure, a separate valve for supplying fluid from said additional source to reinforce and augment the pressure admitted to the brake cylinder, a piston normally exposed on its opposite sides to auxiliary reservoir pressure, and means for releasing pressure from one side of said piston to effect the opening of the valve.

8. In an automatic fluid pressure brake apparatus, the combination, with an auxiliary reservoir, a brake cylinder, a supplemental reservoir, and a separate valve and piston, of a triple valve device adapted to effect graduated or service applications of the brake by discharging fluid under pressure from the auxiliary reservoir to the brake cylinder by a movement of the triple valve piston, and to effect a high pressure application of the brakes by a further movement of the triple valve piston, which latter movement effects a variation of pressure on the separate piston and a discharge of fluid under pressure from the supplemental reservoir to the auxiliary reservoir.

9. In an automatic fluid pressure brake apparatus, the combination, with an auxiliary reservoir, a brake cylinder and a triple valve device, of a supplemental reservoir, a separate valve for discharging fluid from the supplemental reservoir to the auxiliary reservoir in applying the brakes, a piston for operating the valve, which is normally exposed on its opposite sides to auxiliary reservoir pressure, and means for releasing pressure from one side of the piston to effect opening movement of the valve.

10. In an automatic fluid pressure brake system, the combination, with an auxiliary reservoir, a brake cylinder, and a triple valve device, of a supplemental reservoir, a separate or supplemental valve device for discharging fluid from the supplemental reservoir to the auxiliary reservoir in applying the brakes, a piston for operating the valve, which is normally exposed on its opposite sides to auxiliary reservoir pressure, and means whereby movement of the triple valve piston effects a release of fluid from one side of the separate valve piston to the brake cylinder and thereby effects opening movement of the separate valve and a discharge of fluid from the supplemental reservoir to the auxiliary reservoir.

11. In an automatic fluid pressure brake, the combination, with a train pipe, auxiliary reservoir, triple valve device, and brake cylinder, of an additional source of fluid pressure, means for supplying fluid from said additional source to the auxiliary reservoir for effecting a graduated release of the brakes, and a separate valve device operated by fluid pressure for opening communication from said additional source to the auxiliary reservoir for effecting a high pressure application of the brakes.

12. In an automatic fluid pressure brake apparatus, the combination, with an auxiliary reservoir, a brake cylinder, and a triple valve device, of a supplemental reservoir, means for releasing fluid from the supplemental reservoir to the auxiliary reservoir for effecting a graduated release of the brakes, and a separate valve device for releasing fluid from the supplemental reservoir to the auxiliary reservoir for effecting a high pressure application of the brakes.

13. In an automatic fluid pressure brake apparatus, the combination, with an auxiliary reservoir, a brake cylinder, and a triple valve device, of a supplemental reservoir, a passage controlled by the valve device of the triple valve and through which fluid is released from the supplemental reservoir to the auxiliary reservoir in effecting a graduated release of the brakes, a passage through which fluid is released from the supplemental reservoir to the auxiliary reservoir in the application of the brakes, and a separate or supplemental valve device for controlling the latter passage.

14. In an automatic fluid pressure brake, the combination, with an auxiliary reservoir, a brake cylinder, and a triple valve, of a supplemental reservoir, a passage opening into the auxiliary reservoir which is independent of and uncontrolled by the valve device of the triple valve, and a separate valve device comprising a valve and piston actuated by variations of fluid pressure for discharging fluid from the supplemental reservoir to the auxiliary reservoir.

15. In a fluid pressure brake, the combination with a train pipe, auxiliary reservoir and brake cylinder, of an additional source of fluid under pressure, and a valve mechanism operated in emergency applications of the brakes for supplying fluid from the additional source to the auxiliary reservoir for augmenting the brake cylinder pressure.

16. In a fluid pressure brake, the combination with a train pipe, auxiliary reservoir, and an additional source of fluid pressure, of a triple valve device having means for opening communication through a passage for supplying air from said additional source of fluid pressure to the auxiliary reservoir in an emergency application and a valve mechanism operating upon equalization of the auxiliary reservoir and brake cylinder pressures for closing communication through said passage.

WALTER V. TURNER.

Witnesses:
E. A. WRIGHT,
F. H. PARKE.